United States Patent
Sugita et al.

(10) Patent No.: US 8,557,032 B2
(45) Date of Patent: Oct. 15, 2013

(54) OIL GREEN INK COMPOSITION FOR INKJET RECORDING, AND OIL INK SET FOR INKJET RECORDING CONTAINING SAID INK COMPOSITION

(75) Inventors: Yukio Sugita, Yokohama (JP);
Mitsuyoshi Tamura, Yokohama (JP);
Fumie Yamazaki, Yokohama (JP);
Mitsuteru Yamada, Yokohama (JP);
Naoki Shiraishi, Yokohamaa (JP)

(73) Assignee: The Inctec Inc., Kanagawa (JP)

( * ) Notice: Subject to any disclaimer, the term of this patent is extended or adjusted under 35 U.S.C. 154(b) by 564 days.

(21) Appl. No.: 12/410,062

(22) Filed: Mar. 24, 2009

(65) Prior Publication Data

US 2009/0239980 A1    Sep. 24, 2009

(30) Foreign Application Priority Data

Mar. 24, 2008   (JP) .................. 2008-074817

(51) Int. Cl.
*C09D 11/02* (2006.01)
*C09D 11/10* (2006.01)

(52) U.S. Cl.
USPC .............. 106/31.6; 106/31.27; 106/31.58; 106/31.86; 347/100; 524/88; 523/161; 523/160

(58) Field of Classification Search
USPC ........ 106/31.27, 31.6, 31.58, 31.86; 347/100; 523/160, 161; 524/88
See application file for complete search history.

(56) References Cited

U.S. PATENT DOCUMENTS

| | | | |
|---|---|---|---|
| 6,419,733 B1 * | 7/2002 | Sano et al. ................. | 106/31.86 |
| 6,767,090 B2 * | 7/2004 | Yatake et al. ................ | 347/100 |
| 6,984,863 B2 | 1/2006 | Miida | |
| 7,125,447 B2 * | 10/2006 | Sugita et al. ............... | 106/31.58 |
| 7,221,029 B2 | 5/2007 | Miida | |
| 7,276,110 B2 * | 10/2007 | Tsujimura et al. ......... | 106/31.27 |
| 7,462,231 B2 | 12/2008 | Koganehira et al. | |
| 2003/0183872 A1 | 10/2003 | Miida | |
| 2004/0266907 A1 | 12/2004 | Sugita et al. | |
| 2006/0027857 A1 | 2/2006 | Miida | |
| 2007/0266887 A1 | 11/2007 | Koganehira et al. | |
| 2008/0182085 A1* | 7/2008 | Oyanagi et al. ............ | 428/195.1 |

FOREIGN PATENT DOCUMENTS

| | | | |
|---|---|---|---|
| JP | 2003-192947 | | 7/2003 |
| JP | 2004006658 A | | 1/2004 |
| JP | 2007-169492 | | 7/2007 |
| JP | 2007284592 A | * | 11/2007 |
| JP | 2007297595 A | | 11/2007 |
| JP | 2009-128740 | | 6/2009 |
| WO | 2004007626 A1 | | 1/2004 |

OTHER PUBLICATIONS

JP 2007284592 A, Nov. 2007, Machine translation.*

* cited by examiner

*Primary Examiner* — Satya Sastri
(74) *Attorney, Agent, or Firm* — Hogan Lovells US LLP

(57) ABSTRACT

The object of the invention is to provide an inkjet recording oil green ink composition that excels more in terms of all the quality of prints, stability on printing, the ability of prints to be dried, and ink storage stability, and is capable of making wider a color reproduction area expressed by yellow and cyan. The inkjet recording oil green ink composition contains as an organic green pigment coloring agent C. I. Pigment Green 58 comprising a (poly) halogenated zinc phthalocyanine. The invention also provides an ink set comprises the inventive oil green ink composition and further includes at least an oil yellow ink composition and an oil cyan ink composition.

11 Claims, 3 Drawing Sheets

OIL GREEN INK COMPOSITION FOR INKJET RECORDING, AND OIL INK SET FOR INKJET RECORDING CONTAINING SAID INK COMPOSITION

CROSS-REFERENCE TO THE RELATED APPLICATIONS

This application claims the benefit of priority under 35 USC 119 to Japanese Patent Application No. 2008-074817 filed on Mar. 24, 2008, the entire contents of which is incorporated herein by reference.

ART FIELD

The present invention relates generally to an inkjet recording oil green ink composition, and an inkjet oil green ink set containing said ink composition.

BACKGROUND ART

In a conventional inkjet recording mode, in response to electric signals from computers or the like, ink droplets are jetted at fast speed from a print head or spray nozzle onto the material to be recorded, applying prints onto the ink-receiving layer of that material. This inkjet recording mode, because of running quiet and being capable of fast printing, is gaining popularity for use on copiers, facsimiles, posters, displays or the like. Inks used in the inkjet recording mode must suffer from no change with time, maintain the sufficient density of images stably over an extended period of time, and allow images printed onto the material to be recorded to excel in the ability to reproduce the original.

In general, inks have been prepared by blending coloring materials such as dyes or pigments, a dispersant for dispersing them and a solvent, optionally with additives. However, oil inkjet printers are often used out of doors, and so weight is given to the robustness of the coloring materials. Applicant has already filed a patent application (Patent Publication 1) for an oil ink composition for inkjet recording purposes, which is well fit for printing onto polyvinyl chloride base materials and improved in terms of all the quality of prints, stability upon printing the ability of prints to be dried, and ink storage ability. This oil ink composition uses as solvents polyoxyethylene glycol dialkyl ether solvents and/or cyclic ester solvents, and is now being used even indoors because of being of great safety.

On the other hand, aqueous inkjet printers are primarily used indoors, and so weight is given to color saturation rather than robustness, as shown typically in Patent Publication 2. Oil ink compositions getting into outdoor applications, too, must have high color saturation and resolution on a par with those of aqueous inks, and produce images having color reproduction capabilities and color saturation. For oil inks, there is mounting demand for improvements in color reproduction capabilities on recording media. Patent Publication 3 shows that a green ink containing pigment green 36 or pigment green 7 as a green pigment is used to produce a unique color, and there is increasing demand for green pigments capable of making wide a color reproduction area expressed by yellow or cyan.

Patent Publication 1: WO 04/007626 Pamphlet
Patent Publication 2: JP(A) 2007-297595
Patent Publication 3: JP(A) 2004-6658

SUMMARY OF THE INVENTION

Object of the Invention

The present invention has for its object to provide an inkjet recording oil green ink composition that is more improved in terms of all the quality of prints, stability on printing, the ability of prints to be dried, and ink storage ability, and especially an inkjet recording oil green ink set capable of making wide a color reproduction area expressed by yellow and cyan.

Means for Accomplishing the Object

The invention provides an inkjet recording oil green ink composition, characterized in that C. I. Pigment Green 58 comprising a (poly) halogenated zinc phthalocyanine is contained as an organic green pigment coloring agent.

The oil green ink composition of the invention is further characterized in that said coloring agent is contained in an amount of 1 to 10% by mass therein.

The oil green ink composition of the invention is further characterized by at least containing an organic solvent and a fixing resin.

The oil green ink composition of the invention is further characterized by containing as the organic solvent at least 30% by mass of a polyoxyethylene glycol dialkyl ether represented by the following general formula (1) and/or a polyoxyethylene (alkylene) glycol alkyl ether acetate represented by the following general formula (2).

$$X_1-(OC_2H_4)_n-OX_2 \qquad \text{General Formula (1)}$$

Here $X_1$ and $X_2$ are each an alkyl group having 1 to 4 carbon atoms and may be identical or different, and n stands for an integer of 2, 3, and 4.

$$X_5-(O-CH_2-\underset{X_6}{\overset{|}{CH}})_n-O-\overset{O}{\overset{\|}{C}}-CH_3 \qquad \text{General Formula (2)}$$

In Formula (2), $X_5$ is an alkyl group, $X_6$ is a hydrogen atom or an alkyl group, and n stands for an integer of 1, 2, 3, and 4.

The oil green ink composition of the invention is further characterized by containing a cyclic ester solvent represented by the following general formula (3) in an amount of 0.02 to 4 parts by mass per 1 part by mass of the organic solvents represented by the aforesaid general formulae (1) an/or (2).

$$X_3-\underset{O\text{------}CO}{CH(CH_2)_mCH-X_4} \qquad \text{General Formula (3)}$$

In general formula (3), $X_3$ and $X_4$ are each an alkyl or alkenyl group having 1 to 7 carbon atoms and may be identical or different, and m stands for an integer of 1, 2, and 3.

The oil green ink composition of the invention is further characterized by containing the organic solvents represented by the aforesaid general formulae (1), (2) and (3) in a total content of at least 50% by mass.

The oil green ink composition of the invention is further characterized in that said cyclic ester solvent is a γ-lactone solvent.

The oil green ink composition of the invention is further characterized in that said γ-lactone solvent is γ-valerolactone or γ-butyrolactone.

The oil green ink composition of the invention is further characterized by containing a (meth)acrylic resin as a fixing resin.

The oil green ink composition of the invention is further characterized in that said (meth)acrylic resin is a homopolymer of methyl(meth)acrylate or a copolymer of methyl(meth)acrylate and butyl(meth)acrylate.

The oil green ink composition of the invention is further characterized in that said (meth)acrylic resin is a (meth)acrylic resin obtained by solution polymerization occurring in the polyoxyethylene glycol dialkyl ether solvent represented by the general formula (1) and/or the polyoxyethylene (alkylene) glycol alkyl ether acetate solvent represented by the general formula (2) using a radical polymerization initiator.

The oil green ink composition of the invention is further characterized in that said (meth)acrylic resin has a glass transition temperature (Tg) of 70° C. or higher.

The oil green ink composition of the invention is further characterized in that said (meth)acrylic resin has a weight-average molecular weight of 8,000 to 100,000.

The oil green ink composition of the invention is further characterized in that as said fixing resin, a copolymer resin of vinyl chloride/vinyl acetate and/or a cellulose resin are used in addition to the (meth)acrylic resin.

The invention also provides an inkjet recording oil ink set characterized by comprising at least an oil yellow ink composition and an oil cyan ink composition as well as an oil green ink composition containing as an organic green pigment coloring agent C. I. Pigment Green 58 comprising a (poly) halogenated zinc phthalocyanine.

Advantages of the Invention

The inkjet recording oil green ink composition of the invention is well fit for printing onto polyvinyl chloride base materials, and excels more in all the quality of prints, stability on printing, the ability of prints to be dried, and ink storage stability. In addition, the inventive oil green ink composition contains as the organic green pigment coloring agent C. I. Pigment Green 58 comprising a (poly) halogenated zinc phthalocyanine. It is thus possible to make a color reproduction area wider than that expressed by yellow and cyan in conventional yellow, magenta, cyan and black (YMCK) four-color printing, and achieve images having higher color saturation.

BEST MODE FOR CARRYING OUT THE INVENTION

Figure 1:
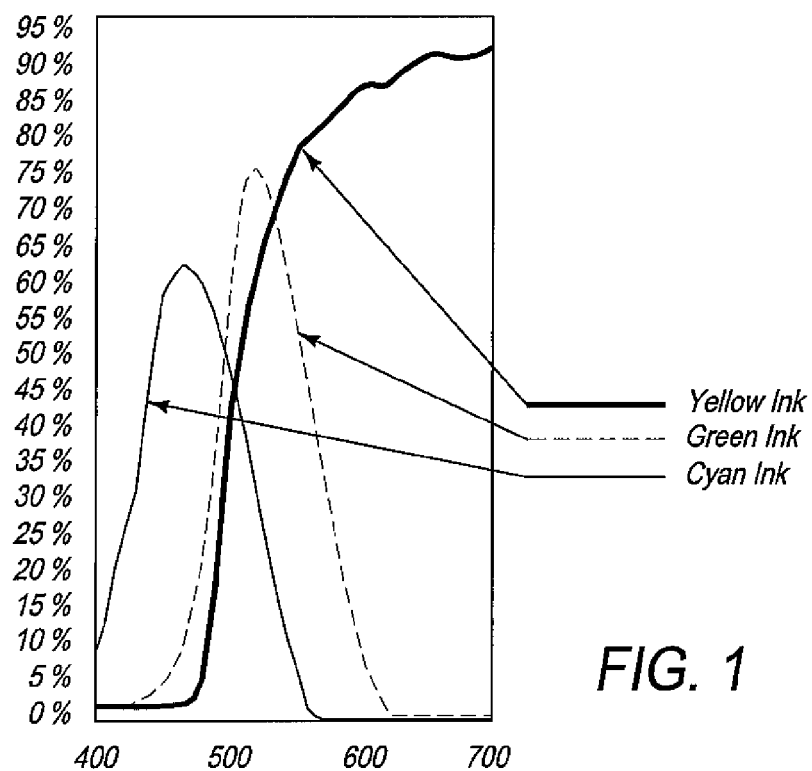
FIG. 1 is a diagram for the results of reflectivity spectra of the respective inks forming the oil ink set of Example 1, as measured on a recording medium in the wavelength range of 400 nm to 700 nm.

The inkjet recording oil green ink composition of the invention is now explained. The (poly)halogenated zinc phthalocyanine pigment is represented by the following general formula (4).

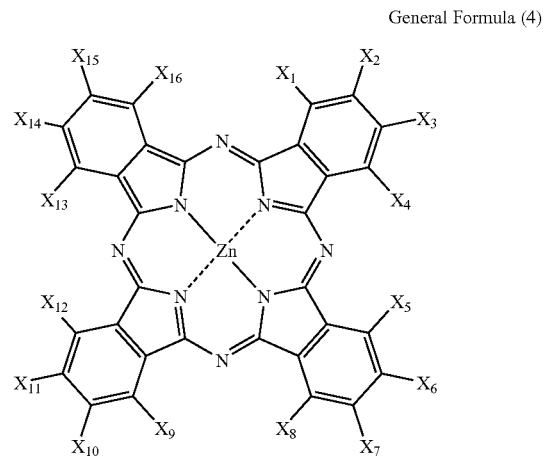

General Formula (4)

In formula (4), $X_1$ to $X_{16}$ are each independently indicative of a chlorine atom, a bromine atom or a hydrogen atom.

The (poly) halogenated zinc phthalocyanine pigment has a structure in which a total of at most 16 chlorine and/or bromine atoms are bonded per one phthalocyanine molecule. As the number of the chlorine and/or bromine atoms bonded into the molecular increases, the hue of the (poly) halogenated zinc phthalocyanine pigment turns from blue to green. For the (poly) halogenated zinc phthalocyanine pigment to turn green, it is preferable that the halogen atoms bonded to the molecule are made of 8 or more bromine atoms and one or more chlorine atoms. It is particularly preferable that 12 or more bromine atoms and two or more chlorine atoms are bonded to the molecule, because more yellowish green having high brightness can be produced. Such a (poly) halogenated zinc phthalocyanine pigment is now registered as C. I. Pigment Green 58.

In the invention, C. I. Pigment Green 58 is used as the (poly) halogenated zinc phthalocyanine pigment to prepare an inkjet recording oil green ink composition containing it in an amount of 1 to 10% by mass, and preferably 2 to 8% by mass.

As the amount of the pigment is below 1% by mass, no sufficient print density is obtained, so that no wider color reproduction area can be obtained when it is formulated into an inkjet recording oil green ink set. As that amount exceeds 10% by mass, on the other hand, there are some limitations on the amount of ink additives such as humectants to be added into the ink in view of an ink viscosity requirement, which may otherwise cause nozzles in an inkjet head to be likely to be clogged up or ink viscosities to grow high, failing to achieve the ability of the ink to be stably jetted.

Referring now to the dispersant, it is preferable to use a high-molecular dispersant. The high-molecular dispersant, for instance, includes a main chain comprising a polyester, polyacrylic, polyurethane, polyamine or polycaprolactone and a side chain comprising a polar group such as an amino, carboxyl, sulfone or hydroxyl group, although preference is given to polyester dispersants.

For instance, use may be made of "SOLSPERSE 32000", "SOLSPERSE 20000", "SOLSPERSE 24000" and "SOLSPERSE 71000", all available from the Lubrizol Cooperation, and "Ajisper PB821" and "Ajisper PB822", all available from Ajinomoto Fine-Techno Co., Inc. The dispersant should preferably be added in an amount of 0.03 parts by mass to 5 parts by mass, and especially 0.05 parts by mass to 5 parts by mass per 1 part by mass of pigment, and contained in an amount of 0.1% by mass to 30% by mass, and especially 0.5% by mass to 20% by mass per ink.

The (meth)acrylic resin is added as the fixing resin into the ink composition. It is here noted that the term "(meth)acrylic resin" means an acrylic resin or a meth-acrylic resin. The acrylic resin, for instance, includes homopolymers or copolymers of alkyl-(meth)acrylates such as ethyl-, propyl- or butyl-(meth)acrylates, and hydroxyalkyl (meth)acrylates such as hydroxymethyl-, hydroxyethyl-, hydroxypropyl-, hydroxybutyl- and hydroxypentyl-(meth)acrylates, although preference is given to a homopolymer of methyl(meth)acrylate, a copolymer of methyl (meth)acrylate and butyl(meth)acrylate, a copolymer of methyl(meth)acrylate and ethyl(meth) acrylate, and a copolymer of methyl(meth)acrylate and propyl(meth) acrylate.

There are also commercially available (meth)acrylic resins such as "Paraloid B99N" (methyl methacrylate/butyl methacrylate copolymer having a Tg of 82° C. and a weight-average molecular weight of 15,000) and "Paraloid B60" (methyl methacrylate/butyl methacrylate having a Tg of 75° C. and a weight-average molecular weight of 50,000), all available from Rohm and Haas Co., Ltd.

The (meth)acrylic resin should preferably be obtained by solution polymerization using a radical polymerization initiator in the polyoxyethylene glycol dialkyl ether represented by the general formula (1) or the polyoxyethylene (alkylene) glycol alkyl ether acetate represented by the general formula (3).

By producing the (meth)acrylic resin by solution polymerization, it is possible to solubilize and use the (meth)acrylic resin hardly dissolvable in the polyoxy-ethylene glycol dialkyl ether or the polyoxyethylene (alkylene) glycol alkyl ether acetate. It is thus possible to obtain an inkjet recording oil ink composition that excels more in the ability of prints to be dried, resistance to scuffing and the ability to re-dissolve.

While the (methacrylic resin may be optional in terms of molecular weight and glass transition temperature (Tg), it has a weight-average molecular weight as calculated on a polystyrene basis of 8,000 to 100,000 and preferably 10,000 to 60,000. The (meth)acrylic resin has preferably a glass transition temperature (Tg) of at least 70° C., and especially at least 80. It is here noted that the upper limit to the glass transition temperature is about 120° C. Maintaining the weight-average molecular weight and Tg within the aforesaid ranges is preferable, because it works much in favor of prints having good ink storage stability, and the ability of ink to be dried and shielded off.

The (meth)acrylic resin in the ink composition should preferably be contained in an amount of 0.01 part by mass to 5 parts by mass, and especially 0.05 parts by mass to 5 parts by mass per 1 part by mass of pigment.

If required, other resins may be used together with the (meth)acrylic resin. The other resins, for instance, include styrene-acrylic resin, rosin-modified resin, phenol resin, terpene resin, polyester resin, polyamide resin, epoxy resin, vinyl chloride-vinyl acetate copolymer resin, cellulose resin such as cellulose acetate butyrate resin, and vinyl toluene-α-methylstyrene copolymer resin. For the vinyl chloride-vinyl acetate copolymer resin, there is the mention of, for instance, "UCAR$^{TH}$ VAGC Solution Vinyl Resin (abbreviated as VAGC)" (hydroxyalkyl acrylate-modified vinyl chloride/vinyl acetate copolymer having a Tg of 65° C. and a weight-average molecular weight of 24,000) made by Dow Chemical Co.

Whenever necessary, stabilizers such as anti-oxidants and ultraviolet absorbers, surface active agents and so on may be used. Preferable antioxidants, for instance, include BHA (2,3-dibutyl-4-oxyanisole) and BHT (2,6-di-t-butyl-p-cresol) that are used in an amount of preferably 0.01% by mass to 3.00% by mass per the total amount of the ink composition. Benzophenone and benzotriazole compounds are exemplars of the ultraviolet absorber that is used in an amount of preferably 0.01% by mass to 0.5% by mass per the total amount of the ink composition. For the surface active agent, every surface active agent from anionic to cationic to amphoteric to nonionic ones may be used in an amount of 0.5% by mass to 4.0% by mass per the total amount of the ink composition.

The solvent in the inventive inkjet recording oil green ink composition may contain a glycol ether dialkyl ether or a polyoxyethylene (alkylene) glycol alkyl ether acetate. The glycol ether dialkyl ether is preferably exemplified by polyoxyethylene glycol dimethyl ether, polyoxyethylene glycol diethyl ether or polyoxyethylene glycol ethyl methyl ether represented by the general formula (1), although diethylene glycol diethyl ether, and tetraethylene glycol dimethyl ether is preferred. Such glycol ether dialkyl ethers may be used alone or in combination of two or more, and smell less strongly, are of great safety and work in favor of working environments because of their high boiling point and low vapor pressure.

Exemplars of the polyoxyethylene (alkylene) glycol alkyl ether acetate represented by the general formula (2) are monomethyl ether acetate, monoethyl ether acetate, and monobutyl ether acetate of ethylene glycol; monomethyl ether acetate of propylene glycol; n-propyl ether acetate, and n-butyl ether acetate of diethylene glycol; and ethyl ether acetate, and n-butyl ether acetate of triethylene glycol, although the monobutyl ether acetate of ethylene glycol is most preferred.

The solvent may also contain the cyclic ester solvent represented by the general formula (3), and exemplars of that are γ-lactone having a five-membered ring structure, δ-lactone having a six-membered ring structure, and ε-lactone having a seven-membered ring structure; for instance, γ-butyrolactone, γ-valerolactone, γ-caprolactone, γ-caprilactone, γ-laurolactone, δ-valerolactone, δ-hexylactone, δ-heptalactone, and ε-caprolactone may be used alone or in admixture. In a preferable embodiment of the invention, the cyclic ester solvent is the γ-lactone having a five-membered ring, and in a more preferable embodiment of the invention, it is γ-butyrolactone, and γ-valerolactone. By use of the cyclic ester solvent, the quality of prints onto the polyvinyl chloride base materials is much more improved.

It is preferable that the cyclic ester solvent represented by the general formula (3) is used in an amount of 0.02 to 4 parts by mass, and especially 0.02 to 0.5 parts by mass per one part by mass of the organic solvents represented by the general formulae (1) and/or (2).

It is preferable that the total content of the organic solvents represented by the general formulae (1), (2) and (3) is at least 50% by mass in the ink composition.

Ink preparation involves uniform mixing of the above respective components thereby dispersing the pigments in the solvents. Typically, dispersion is implemented in a paint shaker using zirconia of ϕ0.8 mm for one hour, after which dispersion is kept on for three hours using zirconia beads of ϕ0.3 mm, thereby regulating ink viscosity to the range to be described later. Note here that the ink viscosity is measured by means of AMVn made by Anton Paar Co. Ltd.

What order the respective components are blended in, and how they are blended together is optional; for instance, they may be determined in consideration of the nature of the blends at the respective steps of the production process involved, ease of production, etc. For instance, one of the respective components alone may be blended independently, or they may be fed and blended in a bulk state to obtain their blend in one blend operation. Alternatively, two or three or more components may be blended together beforehand, and the ensuing blend may then be blended with the rest. Note here that when two or three or more components are blended together beforehand, they may be used in the whole amount or in some of the required amounts.

The oil ink of the invention should preferably be prepared in such a way as to have a viscosity at 20° C. of 3 mPa·s to 15 mPa·s and a surface tension of 20 mN/m 50 mN/m. If the surface tension is within the aforesaid ranger it is then possible to control the wettability of the surface of an inkjet recording printer, thereby facilitating jetting of ink droplets, and control the wettability of the surface of the recording material printed, thereby implementing good printing.

The inkjet recording oil ink set of the invention is now explained with reference to FIGS. 1 to 4.

FIG. 1 is illustrative of the results of reflectivity spectra of cyan, green and yellow inks forming the oil ink set according to Example 1 to be described later, as measured in the wavelength range of 400 nm to 700 nm. As shown, the oil ink set of the invention comprises a cyan ink, a green ink and a yellow ink, and has reflection characteristics such that as the wavelength at which the reflectivity of each ink on a recording medium becomes 5% in the wavelength range of 400 nm to 700 nm, the yellow ink has one wavelength: about 480 nm (C), and the cyan ink has one wavelength: about 550 nm (D). It is also seen that the green ink has two wavelengths (about 460 nm and about 620 nm) where the shorter one is about 460 nm (E) and the longer one is about 620 nm (F). In view of making the color reproduction wide, it is preferable that the shorter wavelength (E) of the green ink is within the range: 440 nm≤E≤500 nm, and that the then maximum reflectivity in the range of 500 nm to 600 nm is 70% or greater. It is here noted that when the cyan ink has two wavelengths, there are also similar relations even if the longer wavelength is going to be D. And the reflectivity of the yellow ink is continuously less than 5% in a wavelength range shorter than the wavelength C, the reflectivity of the cyan ink is continuously less than 5% in a wavelength range longer than the wavelength D, and there is a relation: E<C<D<F satisfied between the wavelengths C, D, E and F.

Figure 3:
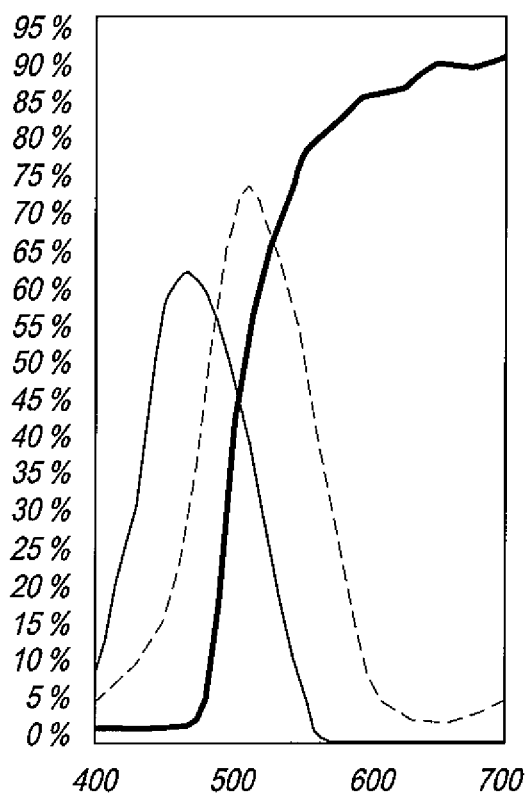
FIG. 3 is a diagram for the results of reflectivity spectra of the respective inks forming the oil ink set of Comparative Example 1, as measured on a recording medium in the wavelength range of 400 nm to 700 nm.

On the other hand, FIG. 3 is illustrative of the results of reflectivity spectra of cyan, green and yellow inks forming the oil ink set according to Comparative Example 1, as measured in the wavelength range of 400 nm to 700 nm. As shown in FIG. 3, in the oil ink set of Comparative Example 1, the green ink is provided by an ink D wherein the green pigment is pigment green 36. As the wavelength at which the reflectivity becomes 5% on the recording medium in the wavelength range of 400 nm to 700 nm, the green ink containing pigment green 36 has two wavelengths; however, the shorter wavelength (E) is not in the range: 440 nm≤E≤500 nm, unlike that in the inventive oil ink set.

Figure 4:
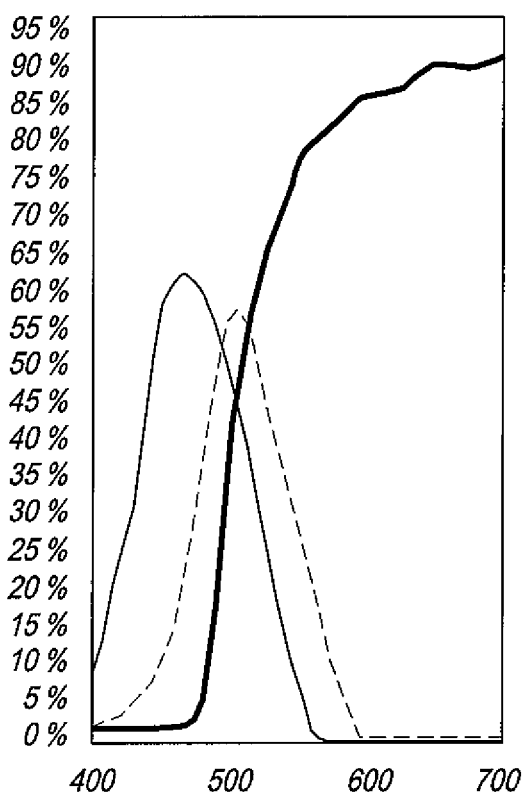
FIG. 4 is a diagram for the results of reflectivity spectra of the respective inks forming the oil ink set of Comparative Example 2, as measured on a recording medium in the wavelength range of 400 nm to 700 nm.

FIG. 4 is illustrative of the results of reflectivity spectra of cyan, green (pigment green 7) and yellow inks forming the oil ink set according to Comparative Example 2, as measured in the wavelength range of 400 nm to 700 nm. As shown in FIG. 4, in the oil ink set of Comparative Example 2, the green ink containing pigment green 7 has two wavelengths as the wavelength at which its reflectivity becomes 5% on the recording medium in the wavelength range of 400 nm to 700 nm; however, the maximum reflectivity is short of 70%. From this, the oil ink set of Comparative Example 2 would have tenuous effects on making wide the color reproduction area for YC.

The green ink of the invention must contain the green pigment that has two wavelengths at which its reflectivity becomes 5% on the recording medium in the wavelength range of 400 nm to 700 nm, and has the shorter wavelength E in the range of 440 nm≤E≤500 nm, with the then maximum reflectivity being 70% or greater in the range of 500 nm to 600 nm. In the ink set of the invention, the pigment in the cyan ink is exemplified by pigment blue 15:4, and that in the yellow ink is exemplified by pigment yellow 150, 180.

The yellow and cyan inks have a hue angle of about 80° to about 110° and an about 230° to about 270°, respectively, as defined on the CIELAB color space on the recording medium. However, the cyan, green and yellow inks in the ink set of the invention have a hue angle (α) in the range of 80° to 270°, as represented by the CIELAB.

The oil ink set may further contain a magenta ink and/or a black ink. For the magenta ink, there is the mention of pigment red 122, and for the black ink, there is the mention of pigment black 7.

It is when used with, for instance, plastic materials and especially a hard or soft polyvinyl chloride base material that the advantages of the invention are most produced. The polyvinyl chloride base material may be used in a film or sheet form. With the inventive ink set, it is possible to apply printing onto an untreated surface of the polyvinyl chloride base material that has so far have difficulty in printing with conventional oil ink compositions, dispensing with expensive recording media like a conventional recording medium having an ink-receiving layer. Of course, the inventive ink set may apply good printing on recording media surface treated with ink-receivable resin too.

EXAMPLES

Although the invention is now explained with reference to a number of inventive and comparative examples, it should be understood that they are given only for the purpose of letting those skilled in the art have a better understanding of the invention, and so do not intend to limit the invention. Unless otherwise stated, the "parts" in the inventive and comparative examples are given by mass.

It is here noted that for analysis, there were samples used that were obtained by the purification by hexane of only resins out of a resin solution. The weight-average molecular weight was measured by gel permeation chromatography with polystyrene used as a standard, using "HLC-8220GPC" made by Tosoh Corporation. The glass transition temperature (Tg) was measured on a differential scanning calorimeter "DSC-50" made by Shimadzu Co., Ltd. The average particle diameter (D50) was measured by a particle size analyzer "Microtrack UPA150" made by Nikkiso Co., Ltd.

(Synthesis of Polymer 1)

Two hundreds (200) grams of methyl methacrylate and 3.6 grams of t-butylperoxy-2-ethylhexanoate were added dropwise over 1.5 hours into 300 grams of diethylene glycol diethyl ether held at 100° C. After the completion of the dropwise addition, a two-hour reaction occurred at 100° C. followed by cooling, thereby obtaining a colorless, transparent solution of Polymer 1 of polymethyl methacrylate. Polymer 1 had a Tg of 105° C. and a weight-average molecular weight of 30,000.

Upon measurement of the mass number of Polymer 1 with MALDI-TOF-MS (a laser ionization time-of-flight mass spectroscopy: "AXIMA-CFR plus, matrix: dithilanol, cationating agent: NaI made by Shimadzu), such results as given below were obtained, with a part of detection peaks shown there too.

Mass Number: 1085, 1123, 1185, 1223, 1285, 1323 (indicative of the mass of the Na$^+$ ionized polymer)

Of the detection peaks, "1085, 1185, 1285" is in agreement with the mass number of Na ions in the polymer having a solvent-derived structure at its terminal, and "1123, 1223, 1323" is in agreement with the mass number of the compound in which the polymer having at its terminal a structure derived from the radial polymerization initiator t-butyperoxy-2-ethylhexanoate is ionized with Na$^+$.

(Synthesis of Polymer 2)

The synthesis process for Polymer 1 was repeated with the exception that ethylene glycol monobutyl ether acetate was used as the solution, thereby obtaining a colorless, transparent solution of Polymer 2 of polymethyl methacrylate. The Tg and weight-average molecular weight of Polymer 2 were 105° C. and 30,000, respectively.

Upon measurement of the mass number of Polymer 2 with MALDI-TOF-MS (a laser ionization time-of-flight mass spectroscopy: "AXIMA-CFR plus, matrix: dithranol, cationating agent: NaI made by Shimadzu), such results as given below were obtained, with a part of detection peaks shown there too.

Mass Number: 823, 883, 923, 983, 1023, 1083 (indicative of the mass of the Na$^+$ ionized polymer)

Of the detection peaks, "883, 983, 1083" is in agreement with the mass number of Na ions in the polymer having a solvent-derived structure at its terminal, and "823, 923, 1023" is in agreement with the mass number of the compound in which the polymer having at its terminal a structure derived from the radial polymerization initiator t-butyperoxy-2-ethylhexanoate is ionized with Na$^+$.

(Preparation of Ink 1)

The solvent used had the following composition.

| | |
|---|---|
| Diethylene glycol diethyl ether | 52.0 parts by mass |
| Tetraethylene glycol dimethyl ether | 19.0 parts by mass |
| γ-Butyrolactone | 5.0 parts by mass |
| γ-Valerolactone | 15.0 parts by mass |

Then, a part of the solvent having the above composition was added with 3.0 parts by mass of pigment green 58 (Fastogen GREEN A110 available from DIC) and 1.0 part by mass of a dispersant "Ajisper" available from Ajinomoto Fine-Techno Co., Ltd., and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare Oil Ink 1 (having a viscosity of 4.3 mPa·s at 20%).

(Preparation of Ink 2)

The solvent used had the following composition.

| | |
|---|---|
| Ethylene glycol monobutyl ether acetate | 68.0 parts by mass |
| γ-Butyrolactone | 20.0 parts by mass |

Then, a part of the solvent having the above composition was added with 3.0 parts by mass of pigment green 58 (Fastogen GREEN A110 available from DIC) and 1.0 part by mass of a dispersant "Ajisper PB821" available from Ajinomoto Fine-Techno Co. Ltd., and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 7.0 parts by mass of a binder resin "Paraloid B60" available from Rohm and Haas (methyl methacrylate/butyl methacrylate copolymer having a Tg of 75° C. and a weight-average molecular weight of 50,000), 1.0 part by mass of a binder resin "VAGC" available from Dow Chemical Co. (hydroxyalkyl acrylate-modified vinyl chloride/vinyl acetate copolymer having a Tg of 65° C. and a weight-average molecular weight of 24,000) and the rest of the mixed solvent obtained as mentioned above were added to it to prepare Oil Ink 2 (having a viscosity of 10.5 mPa·s at 20%)

(Preparation of Ink A)

The solvent used had the following composition.

| | |
|---|---|
| Diethylene glycol diethyl ether | 60.5 parts by mass |
| Tetraethylene glycol dimethyl ether | 15.0 parts by mass |
| γ-Butyrolactone | 15.0 parts by mass |

Then, a part of the solvent having the above composition was added with 3.0 parts by mass of pigment yellow 150 (YELLOW PIGMENT E4GN-GT available from LANXESS) and 2.0 parts by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm) The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 4.0 parts by mass of Polymer 1 as a binder resin, 0.5 parts by mass of "VAGC" available from Dow Chemical, Co. (hydroxyalkyl acrylate-modified vinyl chloride/vinyl acetate copolymer having a Tg of 65° C. and a weight-average molecular weight of 24,000) and the rest of the mixed solvent obtained as mentioned above were added to it to prepare Oil Ink A (having a viscosity of 4.4 mPa·s at 20° C.)+

(Preparation of Ink B)

The solvent used had the following composition.

| | |
|---|---|
| Diethylene glycol diethyl ether | 48.0 parts by mass |
| Tetraethylene glycol dimethyl ether | 28.0 parts by mass |
| γ-Butyrolactone | 15.0 parts by mass |

Then, a part of the solvent having the above composition was added with 3.0 parts by mass of pigment red 122 (FASTGEN SUPER MAGENTA RG available from DIC) and 1.0 part by mass of a dispersant "Ajisper" available from Ajinomoto Fine-Techno Co. Ltd., and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of a binder resin "Paraloid B99N" available from Rohm and Haas (methyl methacrylate/butyl methacrylate copolymer having a Tg of 82° C. and a weight-average molecular weight of 15,000) and the rest of the mixed solvent obtained as mentioned above were added to it to prepare Oil Ink B (having a viscosity of 4.1 mPa·s at 20° C.).

(Preparation of Ink C)

The solvent used had the following composition.

| | |
|---|---|
| Diethylene glycol diethyl ether | 60.0 parts by mass |
| Tetraethylene glycol dimethyl ether | 10.0 parts by mass |
| γ-Butyrolactone | 20.0 parts by mass |

Then, a part of the solvent having the above composition was added with 3.0 parts by mass of pigment blue 15:4 (Cyanine Blue CP-1 available from Dainichiseika Color & Chemicals Mfg. Co., Ltd.) and 2.0 part by mass of a dispersant "SOLSPERSE 32000" available from the Lubrizol Corporation,) and 2.0 part by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 μm.

Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of "Paraloid B60" available from Rohm and Haas (methyl methacrylate/butyl methacrylate copolymer having a Tg of 75° C. and a weight-average molecular weight of 50,000) as a binder resin and the rest of the mixed solvent obtained as mentioned above were added to it to prepare Oil Ink C (having a viscosity of 4.4 mPa·s at 20° C.).

(Preparation of Ink D)

The solvent used had the following composition.

| | |
|---|---|
| Diethylene glycol diethyl ether | 52.0 parts by mass |
| Tetraethylene glycol dimethyl ether | 19.0 parts by mass |
| γ-Butyrolactone | 5.0 parts by mass |
| γ-Valerolactone | 15.0 parts by mass |

Then, a part of the solvent having the above composition was added with 3.0 parts by mass of pigment green 36 (Cyanine Green 5370 available from Dainichiseika Color & Chemicals Mfg. Co., Ltd.) and 1.0 part by mass of a dispersant "Ajisper PB821" available from Ajinomoto Fine-Techno Co. Ltd., and after a one-hour agitation at 3,000 rpm in a dissolver, pre-dispersion was carried out in a bead mill charged with zirconia beads (2 mm). The ensuing pigment particles had an average particle diameter of up to 5 μm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare Oil Ink D (having a viscosity of 4.3 mPa·s at 20° C.).

(Preparation of Ink E)

The solvent used had the following composition.

| | |
|---|---|
| Diethylene glycol diethyl ether | 60.0 parts by mass |
| Tetraethylene glycol dimethyl ether | 10.0 parts by mass |
| Tetraethylene glycol monobutyl ether | 6.0 parts by mass |
| γ-Butyrolactone | 15.0 parts by mass |

Then, a part of the solvent having the above composition was added with 3.0 parts by mass of pigment green 7 (FASTGEN GREEN 5716 available from DIC) and 1.0 part by mass of a dispersant "Ajisper PB821" available from Ajinomoto Fine-Techno Co., Ltd.), and after a one-hour agitation at 3,000 rpm in a dissolver, pre-dispersion was carried out in a bead mill charged with zirconia beads (2 mm). The ensuing pigment particles had an average particle diameter of up to 5 W. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare Oil Ink E (having a viscosity of 4.4 mPa·s at 20%).

(Preparation of Ink F)

The solvent used had the following composition.

| | |
|---|---|
| Diethylene glycol diethyl ether | 62.0 parts by mass |
| Tetraethylene glycol dimethyl ether | 10.0 parts by mass |
| γ-Butyrolactone | 18.0 parts by mass |

Then, a part of the solvent having the above composition was added with 3.0 parts by mass of pigment black 7 (CARBON BLACK MA-8 available from Mitsubishi Chemical) and 2.0 parts by mass of a dispersant "SOLSPERSE 32000"

available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 5.0 parts by mass of Polymer 1 as a binder resin and the rest of the mixed solvent obtained as mentioned above were added to it to prepare Oil Ink F (having a viscosity of 4.3 mPa·s at 20° C.)

(Preparation of Polymer G)

The solvent used had the following composition.

| Ethylene glycol monobutyl ether acetate | 67.0 parts by mass |
| γ-Butyrolactone | 20.0 parts by mass |

Then, a part of the solvent having the above composition was added with 3.0 parts by mass of pigment yellow 180 (NOVOPERM YELLOW P-HG available from Clariant available from DIC) and 2.0 part by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 8.0 parts by mass of Polymer 1 as a binder resin and the rest of the mixed solvent obtained as mentioned above were added to it to prepare Oil Ink G (having a viscosity of 8.2 mPa·s at 20%).

(Preparation of Ink H)

The solvent used had the following composition.

| Diethylene glycol diethyl ether | 20.0 parts by mass |
| Ethylene glycol monobutyl ether acetate | 46.0 parts by mass |
| γ-Butyrolactone | 15.0 parts by mass |
| γ-Valerolactone | 5.0 parts by mass |

Then, a part of the solvent having the above composition was added with 3.0 parts by mass of pigment red 122 (FASTGEN SUPER MAGENTA RG available from DIC) and 2.0 parts by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 nm) to obtain a pigment dispersion. The pigment particles obtained by that dispersion had an average particle diameter of 250 µm.

While the obtained pigment dispersion was stirred at 1,500 rpm, 8.0 parts by mass of Polymer 2 as a binder resin, 1.0 part by mass of a binder resin 'VAGC' available from Dow Chemical Co. (hydroxyalkyl acrylate-modified vinyl chloride/vinyl acetate copolymer having a Tg of 65° C. and a weight-average molecular weight of 24,000) and the rest of the mixed solvent obtained as mentioned above were added to it to prepare Oil Ink H (having a viscosity of 9.3 mPa·s at 20%)

(Preparation of Ink I)

The solvent used had the following composition.

| Ethylene glycol monobutyl ether acetate | 57.0 parts by mass |
| Propylene glycol monomethyl ether acetate | 10.0 parts by mass |
| γ-Butyrolactone | 20.0 parts by mass |

Then, a part of the solvent having the above composition was added with 3.0 parts by mass of pigment blue 15:4 (Cyanine Blue CP-1 available from Dainichiseika Color & Chemicals Mfg. Co., Ltd.) and 2.0 parts by mass of a dispersant "SOLSPERSE 32000" available from the Lubrizol Cooperation, and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 8.0 parts by mass of a binder resin "Paraloid B60" available from Rohm and Haas (methyl methacrylate/butyl methacrylate copolymer having a Tg of 75° C. and a weight-average molecular weight of 50,000) and the rest of the mixed solvent obtained as mentioned above were added to it to prepare Oil Ink I (having a viscosity of 9.5 mPa·s at 20° C.)

(Preparation of Ink J)

The solvent used had the following composition.

| Ethylene glycol monobutyl ether acetate | 57.0 parts by mass |
| Propylene glycol monomethyl ether acetate | 10.0 parts by mass |
| γ-Butyrolactone | 20.0 parts by mass |

Then, a part of the solvent having the above composition was added with 3.0 parts by mass of pigment black 7 (CARBON BLACK MA-8 available from Mitsubishi Chemical) and 2.0 parts by mass of a dispersant "SOLSPERSE 32000" available from the Lubrizol Corporation, and after a one-hour agitation at 3,000 rpm in a dissolver, pre-dispersion was carried out in a bead mill charged with zirconia beads (2 mm). The ensuing pigment particles had an average particle diameter of up to 5 µm. Then, dispersion was implemented in a nanomill charged with zirconia beads (0.3 mm) to obtain a pigment dispersion. The pigment particles obtained by that dispersion had an average particle diameter of 250 nm.

While the obtained pigment dispersion was stirred at 1,500 rpm, 8.0 parts by mass of a binder resin "Paraloid B99N" available from Rohm and Hass (methyl methacrylate/butyl methacrylate copolymer having a Tg of 82° C. and a weight-average molecular weight of 15,000) and the rest of the mixed solvent obtained as mentioned above were added to it to prepare Oil Ink J (having a viscosity of 7.6 mPa·s at 20° C.).

(First Oil Ink Set)

The oil inks set out in the following Table 1 were combined into oil ink sets.

TABLE 1

|  | Cyan | Green | Yellow | Magenta | Black |
|---|---|---|---|---|---|
| Ex. 1 | Ink C | Ink 1 | Ink A | Ink B | Ink F |
| Ex. 2 | Ink I | Ink 2 | Ink G | Ink H | Ink J |
| Comp. Ex. 1 | Ink C | Ink D | Ink A | Ink B | Ink F |
| Comp. Ex. 2 | Ink C | Ink E | Ink A | Ink B | Ink F |

Each of the oil ink sets obtained as mentioned above was loaded in "Four-Color Inkjet Printer MJ8000C" available from Seiko Epson Co., Ltd., and prints were applied onto a soft polyvinyl chloride (LAG Mount P-223RW available from Lintec Co., Ltd.) to measure the reflectivity spectrum, $L^*$ value, $a^*$ value, $b^*$ value and hue angle $H°$ of the printed ink by means of "GRETAG Spedtrolino" (D65 light source, and a field angle of 2°) available from Gretag Co., Ltd.

Figure 2:
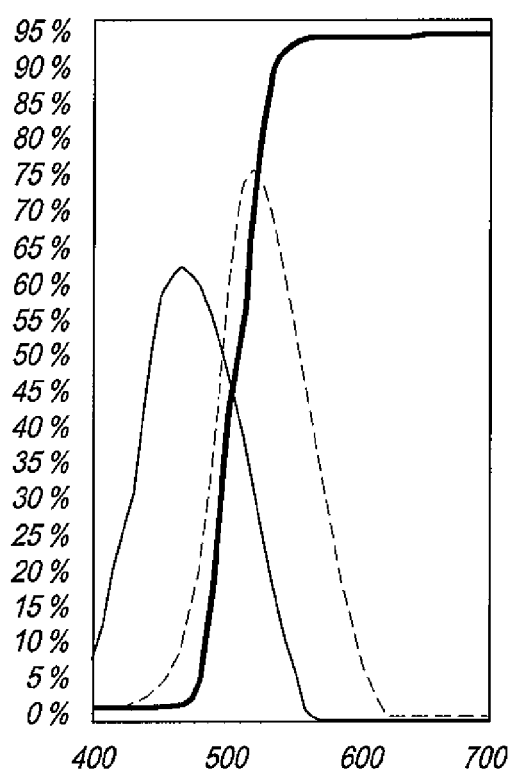
FIG. 2 is a diagram for the results of reflectivity spectra of the respective inks forming the oil ink set of Example 2, as measured on a recording medium in the wavelength range of 400 nm to 700 nm.

FIG. 1 is a diagram for the reflectivity spectra of the cyan (thin line), the green (dotted line), and the yellow ink (thick line) in the oil ink set of Example 1, as measured in the wavelength range of 400 nm to 700 nm. FIGS. 2, 3 and 4 are diagrams for the reflectivity spectra of the oil inks in Example 2 and Comparative Examples 1 and 2, respectively, as again measured in the wavelength range of 400 nm to 700 nm.

Basically, the oil ink set of the invention comprises a cyan ink, a green ink and a yellow ink. It is seen from FIGS. 1 and 2 that as the wavelength at which the reflectivity of each ink becomes 5% on the recording medium in the wavelength range of 400 nm to 700 nm, the yellow ink has one wavelength: about 480 nm (C), and the cyan ink has one wavelength: about 550 nm (D). It is also seen that the green ink has two wavelengths (about 460 nm and about 620 nm) where the shorter one is about 460 nm (E) and the longer one is about 620 nm (F). In view of making the color reproduction wide, it is preferable that the shorter wavelength (E) of the green ink is within the range: 440 nm≤E≤500 nm, and that the then maximum reflectivity in the range of 500 nm to 600 nm is 70% or greater. It is here noted that when the cyan ink has two wavelengths, there are also similar relations even if the longer wavelength is going to be D. And the reflectivity of the yellow ink is continuously less than 5% in a wavelength range shorter than the wavelength C, the reflectivity of the cyan ink is continuously less than 5% in a wavelength range longer than the wavelength D, and there is the relation; E<C<D<F satisfied between the wavelengths C, D, E and F. It is further seen that the maximum reflectivity between the two wavelengths of the green ink reaches as high as 75%.

And, as can be seen from FIG. 3, when pigment green 36 is used as the green pigment, there are two wavelengths at which the reflectivity of the ink becomes 5% on the recording medium in the wavelength range of 400 nm to 700 nm. However, the shorter wavelength (E) is not within the range of 440 nm≤E≤500 nm, unlike that in the inventive oil ink set.

It is also seen from FIG. 4 that when pigment green 7 is used, there are two wavelengths at which the reflectivity of the ink becomes 5% on the recording medium in the wavelength range of 400 nm to 700 nm; however, the maximum reflectivity does not reach 70%, unlike the inventive oil ink set.

Figure 5:
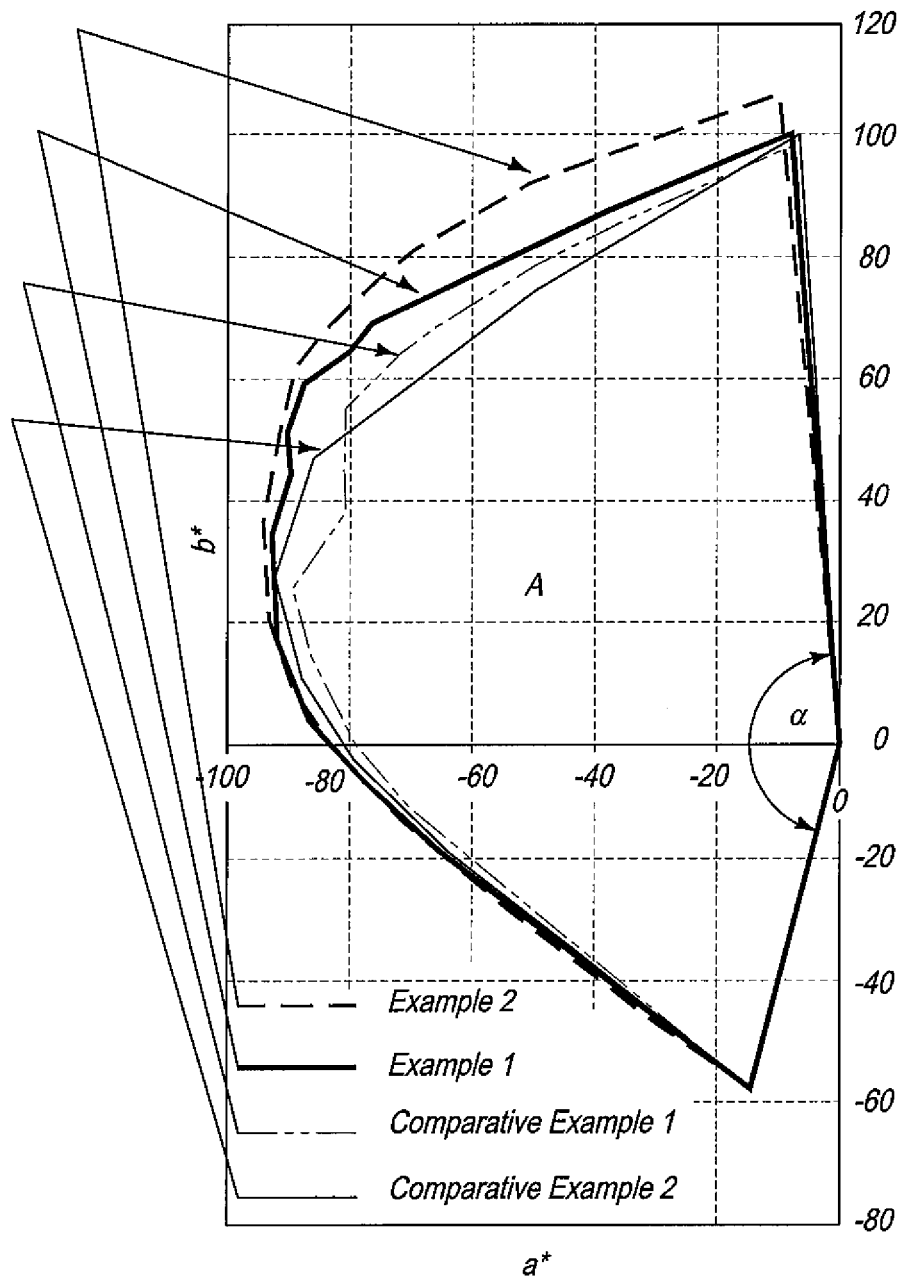
FIG. 5 is illustrative of a color reproduction area for the oil ink set of the invention in terms of the L*a*b* chromaticity diagram.

FIG. 5 is illustrative of the color reproduction area achieved by each of Examples 1 and 2, and Comparative Examples 1 and 2 in terms of the $L^*a^*b^*$ chromaticity diagram. Tabulated in Table 2, given just below, are the $L^*a^*b^*$ values and hue angles of prints obtained through Ink 1, Ink 2, Ink A, Ink B, Ink C, Ink D, Ink E, Ink G, Ink H and Ink I used in Examples 1-2 and Comparative Examples 1-2.

TABLE 2

| Ink (Pigment) | $L^*$ | $a^*$ | $B^*$ | Hue Angle $H°$ |
|---|---|---|---|---|
| Ink 1 (PG58) | 69.2 | −91.5 | 48.3 | 152.2 |
| Ink 2 (PG58) | 69.2 | −91.5 | 48.3 | 152.2 |
| Ink A (PY150) | 87.1 | −6.8 | 101.3 | 93.8 |
| Ink B (PR122) | 44.3 | 79.9 | −18.5 | 347.0 |
| Ink C (PB15:4) | 42.4 | −12.8 | −58.0 | 257.5 |
| Ink D (2G36) | 70.7 | −77.1 | 28.9 | 159.4 |
| Ink E (PG7) | 55.1 | −84.9 | 6.8 | 175.4 |
| Ink G (PY180) | 91.7 | −9.6 | 109.0 | 95.1 |
| Ink H (PR122) | 44.3 | 79.9 | −18.5 | 347.0 |
| Ink I (PB15:4) | 42.4 | −12.8 | −58.0 | 257.5 |

Referring here to FIG. 5, the color reproduction area for the ink set is indicated by a fan-form area A delimited by a straight line connecting the $a^*b^*$ coordinates for the cyan ink with the origin and a straight line connecting the $a^*b^*$ coordinates for the yellow ink with the origin, with an angle (hue angle ($\alpha$)) made between two such straight lines and on a side containing the $a^*b^*$ coordinates for the green ink.

Tabulated in Table 3, given just below, are the found values of the area (A) in the respective ink sets of Examples 1-2 and Comparative Examples 1-2, its ratio (%) relative to the area in Comparative Example 1 and estimation of the ability to reproduce colors. In the estimation of the ability to reproduce colors, the symbol ○ indicates that the ability to reproduce colors is high: the area ratio to the area of Comparative Example 1 is greater than 100%.

TABLE 3

|  | Area | Area Ratio | Estimation |
|---|---|---|---|
| Ex. 1 | 9593 | 107% | ○ |
| Ex. 2 | 10280 | 116% | ○ |
| Comp. Ex. 1 | 8987 | 100% | — |
| Comp. Ex. 2 | 8876 | 93% | — |

With the inventive oil green ink composition, it is possible to set up an ink set capable of achieving higher color reproduction area as compared with the comparative green ink compositions.

APPLICABILITY TO THE INDUSTRY

The present invention provides an inkjet recording oil green ink composition that is improved in terms of all the quality of prints, stability on printing, the ability of prints to be dried and ink storage ability, giving an inkjet recording oil ink set capable of making wide the color reproduction area expressed by yellow and cyan.

What we claim is:

1. An oil ink set for inkjet recording comprising:
a combination at least including an oil cyan ink composition, an oil green ink composition and an oil yellow ink composition for formation of a color reproduction area, characterized in that as a wavelength at which reflectivity becomes 5% in reflectivity spectra on a recording medium in a wavelength range of 400 nm to 700 nm, said oil yellow ink composition has one wavelength C, said oil cyan ink composition has one wavelength D or two wavelengths provided that the shorter is taken as D, and said oil green ink composition has two wavelengths E and F where E is the shorter wavelength and F is the longer wavelength, the shorter wavelength E of said oil green ink composition is in a range from 400 nm to 500 nm with a maximum reflectivity of 70% or higher in a range from 500 nm to 600 nm, a reflectivity of said yellow ink composition is continuously lower than 5% in a wavelength range below the wavelength C, a reflectivity of said oil cyan ink composition is continuously lower than 5% in a wavelength range exceeding the wavelength D, the wavelengths C, D, E and F satisfy a relation: E<C<D<F, said oil green ink composition is a green ink selected from Pigment Green 58, and each ink composition contains as an organic solvent at least 30% by mass of a polyoxyethylene glycol dialkyl ether represented by the following general formula (1) and/or a polyoxyethylene (alkylene) glycol alkyl ether acetate represented by the following general formula (2):

$X_1$—$(OC_2H_4)_n$—$OX_2$   General Formula (1)

where $X_1$ and $X_2$ are each an alkyl group having 1 to 3 carbon atoms and may be identical or different, and n stands for an integer of 2, 3, and 4; and

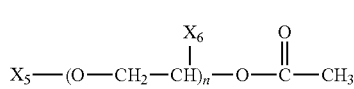

General Formula (2)

where $X_5$ is an alkyl group, $X_6$ is a hydrogen atom or an alkyl group, and n stands for an integer of 1, 2, 3, and 4.

2. The oil ink set for inkjet recording according to claim 1, characterized in that the oil cyan ink composition, the oil green ink composition, and the oil yellow ink composition have a hue angle (α) in a range from 80° to 270°, as represented by the CIELAB.

3. The oil ink set for inkjet recording according to claim 1, characterized by being further combined with a magenta ink composition and/or black ink composition in addition to the oil cyan ink composition, the oil green ink composition and the yellow ink composition.

4. The oil ink set for inkjet recording according to claim 1, characterized in that each ink composition contains per 1 part by mass of the organic solvents represented by the general formulae (1) and/or (2) 0.02 to 4 parts by mass of a solvent selected from γ-valerolactone, γ-butyrolactone or a cyclic ester solvent represented by the following general formula (3):

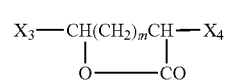

General Formula (3)

where $X_3$ and $X_4$ are each a hydrogen atom or an alkyl or alkenyl group having 1 to 7 carbon atoms and may be different or identical, and m is an integer of 1, 2 and 3.

5. The oil ink set for inkjet recording according to claim 4, characterized in that the oil green ink composition contains the organic solvents represented by the general formulae (1), (2) and (3) in a total amount of at least 50% by mass.

6. The oil ink set for inkjet recording according to claim 1, characterized in that the oil green ink composition contains a fixing resin.

7. The oil ink set for inkjet recording according to claim 6, characterized in that a (meth)acrylic resin is contained as the fixing resin.

8. The oil ink set for inkjet recording according to claim 7, characterized in that the (meth)acrylic resin is a homopolymer of methyl (meth)acrylate or a copolymer of methyl (meth)acrylate and butyl (meth)acrylate.

9. The oil ink set for inkjet recording according to claim 8, characterized in that in addition to the (meth)acrylic resin, a vinyl chloride/vinyl acetate copolymer resin and/or a cellulosic resin are contained as the fixing resin.

10. The oil ink set for inkjet recording according to claim 7, characterized in that said (meth)acrylic resin has a glass transition temperature (Tg) of 70° C. or higher.

11. The oil ink set for inkjet recording according to claim 7, characterized in that said (meth)acrylic resin has a weight-average molecular weight of 8,000 to 100,000.

* * * * *